(12) United States Patent
Miyaoka

(10) Patent No.: US 7,289,408 B2
(45) Date of Patent: Oct. 30, 2007

(54) METHOD AND APPARATUS FOR REPRODUCING RECORDING MARK BELOW DIFFRACTION LIMIT OF LIGHT FROM OPTICAL RECORDING MEDIUM

(75) Inventor: Yasuyuki Miyaoka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 631 days.

(21) Appl. No.: 10/863,470

(22) Filed: Jun. 9, 2004

(65) Prior Publication Data

US 2004/0252589 A1 Dec. 16, 2004

(30) Foreign Application Priority Data

Jun. 16, 2003 (JP) ............... 2003-170812

(51) Int. Cl.
*G11B 11/03* (2006.01)
(52) U.S. Cl. ............... 369/53.31; 369/124.01
(58) Field of Classification Search ............... None
See application file for complete search history.

(56) References Cited

U.S. PATENT DOCUMENTS

| | | | |
|---|---|---|---|
| 5,091,897 A | 2/1992 | Otokawa et al. ............... 369/13 |
| 5,233,578 A | 8/1993 | Yamamoto et al. ............... 369/13 |
| 5,398,227 A | 3/1995 | Miyaoka et al. ............... 369/116 |
| 5,953,289 A | 9/1999 | Miyaoka ............... 369/13 |
| 6,027,825 A | 2/2000 | Shiratori et al. ............... 428/694 |
| 6,058,077 A | 5/2000 | Miyaoka ............... 369/13 |
| 6,069,852 A | 5/2000 | Miyaoka et al. ............... 369/13 |
| 6,246,641 B1 | 6/2001 | Miyaoka ............... 369/13 |
| 6,249,489 B1 | 6/2001 | Fujii et al. ............... 369/13 |
| 6,249,490 B1 | 6/2001 | Miyaoka ............... 369/13 |
| 6,314,061 B1 | 11/2001 | Miyaoka ............... 369/13 |
| 6,343,052 B1 | 1/2002 | Hashimoto et al. ............... 369/13 |
| 6,399,174 B1 | 6/2002 | Shiratori et al. ............... 428/64.3 |
| 6,403,148 B1 | 6/2002 | Shiratori et al. ............... 427/128 |
| 6,646,968 B1 | 11/2003 | Miyaoka ............... 369/53.31 |
| 6,716,489 B2 | 4/2004 | Miyaoka ............... 427/548 |
| 2003/0002419 A1* | 1/2003 | Kuma et al. ............... 369/59.22 |
| 2003/0202429 A1 | 10/2003 | Miyaoka ............... 369/13.27 |
| 2003/0202445 A1* | 10/2003 | Fujiwara et al. ............... 369/59.16 |

FOREIGN PATENT DOCUMENTS

JP 6-290496 10/1994

* cited by examiner

*Primary Examiner*—Paul W. Huber
(74) *Attorney, Agent, or Firm*—Fitzpatrick, Cella, Harper & Scinto

(57) ABSTRACT

The object of the present invention is to realize reduction of the level jitter generated from a noise component at a signal saturation level or a waveform distortion in a portion except for signal polarity portions (rising edge and falling edge), and good error characteristics. In the present invention, a predetermined upper or lower limit value is set to reproduction signals, the reproduction signals are subjected to a limiter processing for correcting reproduction signals of the upper limit value or more, or the lower limit value or less to the level of the upper limit value or the lower limit value, respectively, the signal subjected to the limiter processing is subjected to a partial response equalizing (PR equalizing) processing, and PR reproduction is performed to improve the level jitter at PR detection time and the error rate at information reproduction time.

8 Claims, 10 Drawing Sheets

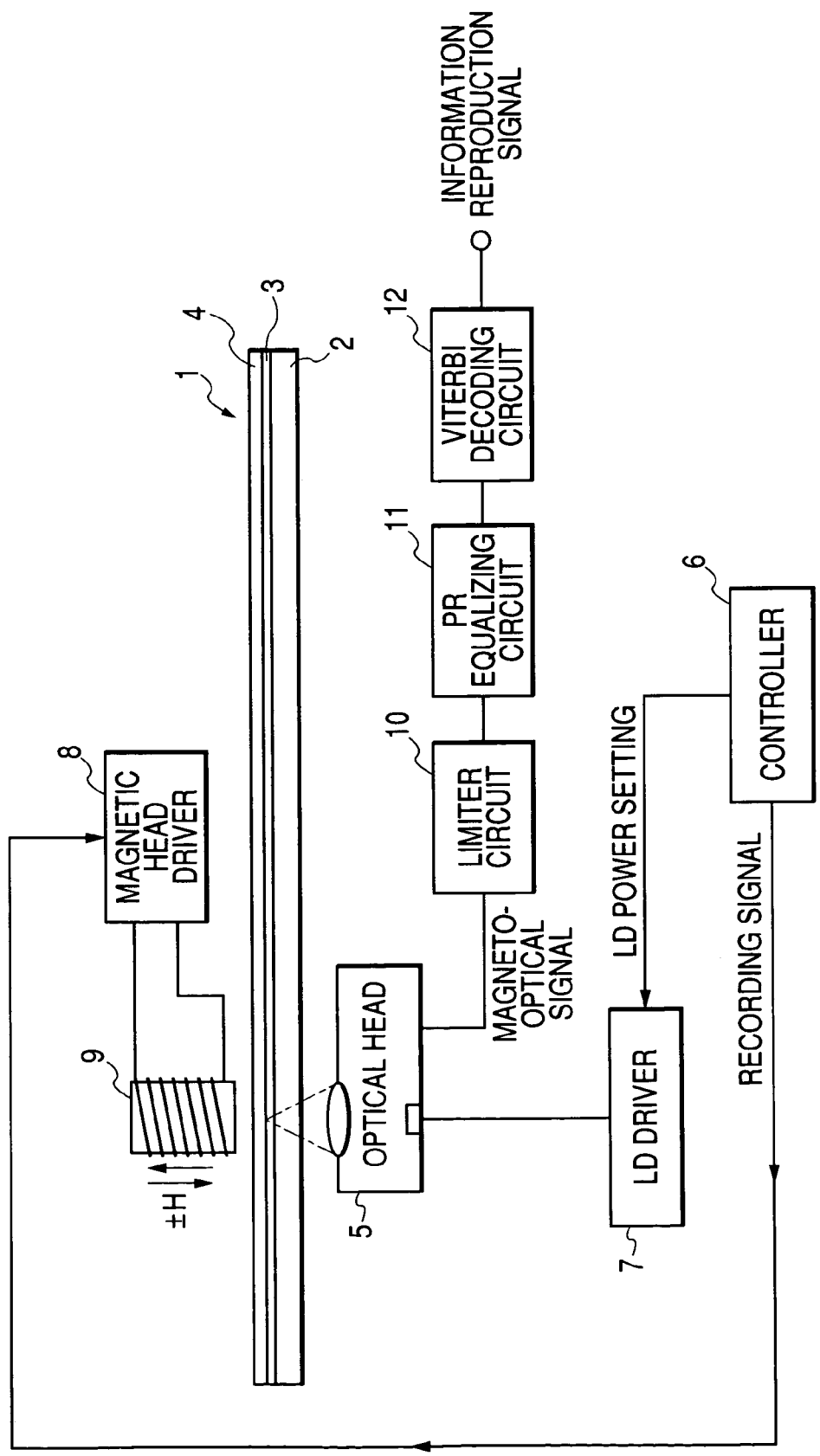

FIG. 3A
RECORDING INFORMATION STRING  0 0 0 1 0 0 0 1 0 0 1 0 0 0 0 1 0 0 0 1 0 0 0 0 0 1 0 0 1 0 1 0 0
FIG. 3B
RECORDING SIGNAL STRING
FIG. 3C
RECORDING MARK STRING
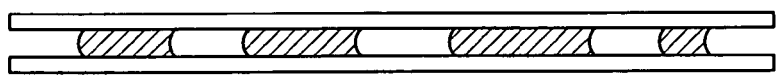
FIG. 3D
REPRODUCTION SIGNAL
FIG. 3E
LIMITER OUTPUT
FIG. 3F
PR OUTPUT
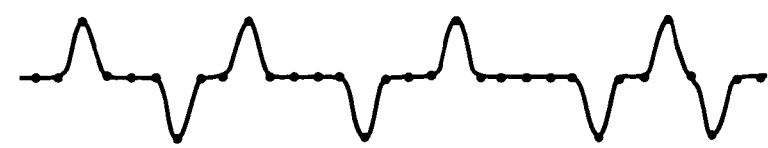
FIG. 3G
LEVEL JITTER
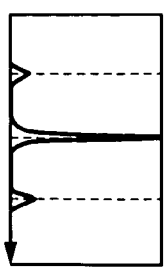

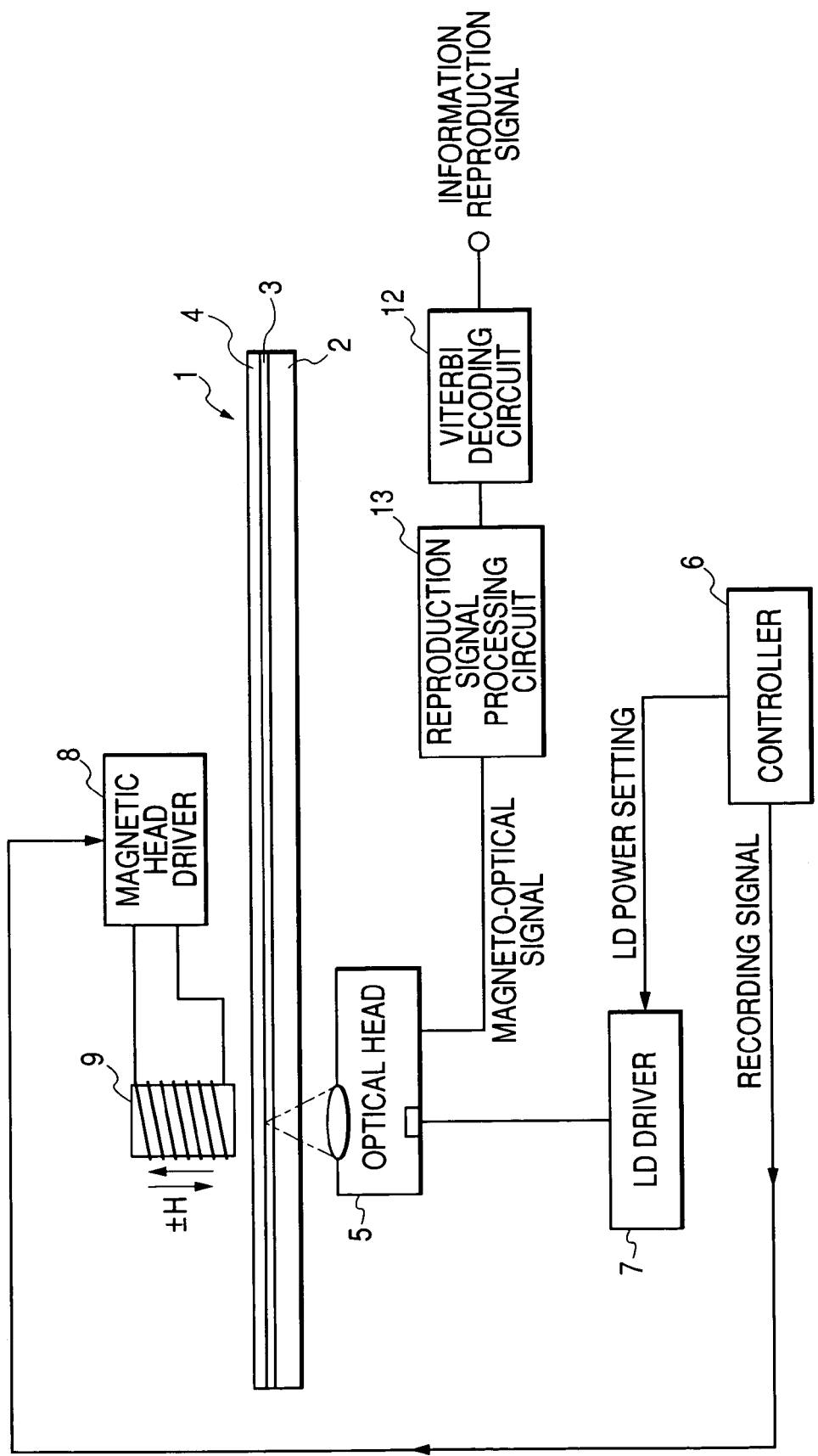

FIG. 5A
RECORDING INFORMATION STRING
0 0 0 1 0 0 0 1 0 0 1 0 0 0 0 1 0 0 0 1 0 0 0 0 0 1 0 0 1 0 1 0 0
FIG. 5B
RECORDING SIGNAL STRING
FIG. 5C
RECORDING MARK STRING
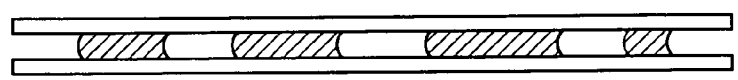
FIG. 5D
REPRODUCTION SIGNAL
FIG. 5E
SAMPLING STRING
FIG. 5F
LIMIT PROCESSING $V_1(i)$
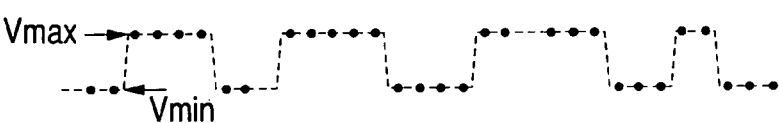
FIG. 5G
PR EQUALIZING PROCESSING $V_{pr1}(i)$
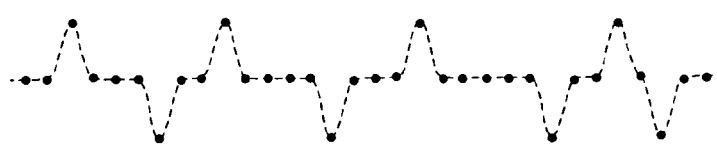
FIG. 5H
LEVEL JITTER
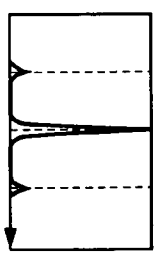

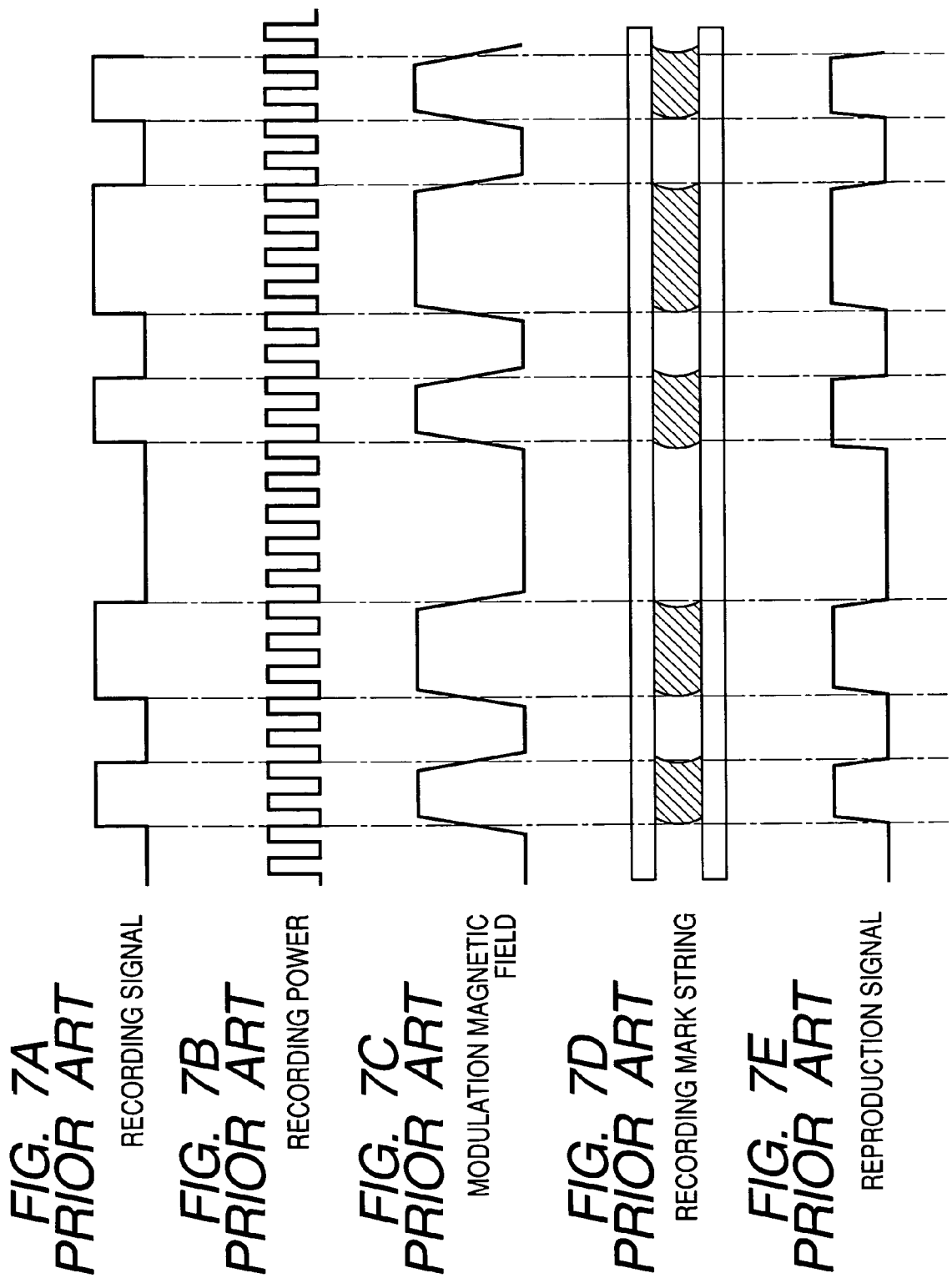

FIG. 9A PRIOR ART
INFORMATION SIGNAL STRING  0 0 0 1 0 0 0 1 0 0 1 0 0 0 0 1 0 0 0 1 0 0 0 0 0 1 0 0 1 0 1 0 0
FIG. 9B PRIOR ART
RECORDING SIGNAL STRING 
FIG. 9C PRIOR ART
RECORDING MARK STRING 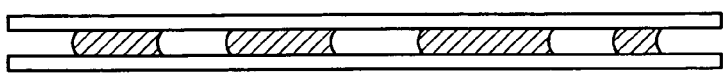
FIG. 9D PRIOR ART
REPRODUCTION SIGNAL 
FIG. 9E PRIOR ART
SAMPLING STRING 
FIG. 9F PRIOR ART
PR EQUALIZING PROCESSING 
FIG. 9G PRIOR ART
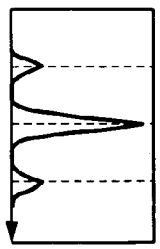
FIG. 9H PRIOR ART
0 0 0 1 0 0 0 1 0 0 1 0 0 0 0 1 0 0 0 1 0 0 0 0 0 1 0 0 1 0 1 0 0

METHOD AND APPARATUS FOR REPRODUCING RECORDING MARK BELOW DIFFRACTION LIMIT OF LIGHT FROM OPTICAL RECORDING MEDIUM

BACKGROUND OF THE INVENTION

1. Field of the Invention

The present invention relates to a method and apparatus for reproducing information by irradiating an optical recording medium with a reproduction light beam, and in particular to a method and apparatus for reproducing information using a magneto-optical recording medium of domain wall displacement detection type.

2. Related Background Art

Conventionally, a magneto-optical recording medium has been used for a rewritable high-density recording system in which information is recorded by writing magnetic domains in a magnetic thin film using the thermal energy of a semiconductor laser and from which the information is read using a magneto-optical effect. Also, in recent years, a demand has grown to further enhance the recording density of this magneto-optical recording medium to obtain a large-capacity recording medium.

By the way, the linear recording density of an optical disk, such as a magneto-optical recording medium, greatly depends on the laser wavelength of a reproduction optical system and the numerical aperture of an objective lens. That is, when the laser wavelength $\lambda$ of the reproduction optical system and the numerical aperture NA of the objective lens are determined, the diameter of a beam waist is also determined. Hence, the detectable spatial frequency at the time of reproduction of recording marks has an upper limit of around $2\,NA/\lambda$.

Therefore, in order to increase the density of the conventional optical disk, it is necessary to shorten the laser wavelength of the reproduction optical system and to increase the NA of the objective lens. However, the improvement of the laser wavelength and the numerical aperture of the objective lens has limitations. Consequently, various techniques have been developed to improve the recording density by devising the construction of the recording medium and a reading method therefrom.

For instance, Japanese Patent Application Laid-Open No. H06-290496 proposes a signal reproduction method and apparatus for recording a signal in a recording layer that is a multilayered film including a reproduction layer and a recording layer magnetically connected to each other, and at the time of reproduction, displacing the domain wall of a recording mark of the reproduction layer without changing recording data in the recording layer by utilizing a temperature gradient caused by irradiation with a light beam for heating to thereby magnetize almost the entire region of the reproduction layer in the spot of the light beam for reproduction in the same direction, detecting the change of the deflecting surface of reflection light of the light beam for reproduction and reproducing the recording mark below the diffraction limit of light.

According to this method, a reproduction signal becomes a rectangular shape, so that it becomes possible to reproduce the recording mark below the diffraction limit of an optical system without lowering a reproduction signal amplitude, thereby largely improving the recording density and the transfer rate.

FIG. 6 is a block diagram showing a construction of a magneto-optical recording and reproduction apparatus using a magneto-optical recording medium of domain wall displacement detection type. In this figure, reference numeral 1 denotes a magneto-optical disk of domain wall displacement detection type. This magneto-optical disk 1 has a construction where a magneto-optical recording film 3 is formed on a substrate 2 made of glass or a plastic, and a protective film 4 is further formed on the magneto-optical recording film 3.

The magneto-optical recording film 3 is produced by stacking a plurality of magnetic layers, and information is reproduced from the film by displacing the domain wall of a recording mark of the reproduction layer and enlarging magnetization in a reproduction spot without changing recording data in the recording layer by utilizing a temperature gradient caused by irradiation with a light beam for reproduction in a manner to be described in detail later. Then, changing of the deflecting surface of reflection light of the light beam for reproduction by the medium is detected and the recording mark below the diffraction limit of an optical system is reproduced.

The magneto-optical disk 1 is supported above a spindle motor (not shown) by magnet chucking or the like and is set so as to be freely rotated with respect to a rotation axis. Reference numeral 5 denotes an optical head that irradiates the magneto-optical disk 1 with laser light for recording/reproduction and gains information from reflection light. This optical head 5 includes a condensing lens (for instance, NA: 0.60), an actuator that drives the condensing lens, a semiconductor laser (for instance, wavelength $\lambda$: 650 nm), a beam splitter, a polarizing beam splitter, and a photosensor that detects reflection light from the magneto-optical disk 1. The laser light emitted from the semiconductor laser is applied to the magneto-optical disk 1 through a group of optical components such as the condensing lens.

At this time, the condensing lens is controlled by the actuator so as to move in a focusing direction and a tracking direction in order to sequentially focus the laser light on the magneto-optical recording film 3 of the magneto-optical disk 1 and to perform tracking along a guide groove formed in the magneto-optical disk 1.

The laser light reflected from the magneto-optical disk 1 is detected by the photosensor through the group of optical components. The photosensor is divided into a plurality of sensors, with the laser light being deflected in different defection directions corresponding to the polarity of the magnetization of the magneto-optical recording film 3 and being condensed on the respective sensors corresponding to the different defection directions. Then, differential amplification of outputs from those sensors generates a magneto-optical signal. This magneto-optical signal is inputted into a partial response maximum likelihood (PRML) processing circuit through LPF (not shown) and the like, thereby gaining reproduction information with higher accuracy. In this specification, a PR equalizing circuit 11 for performing waveform equalization of a reproduction signal and a Viterbi decoding circuit 12 for performing Viterbi decoding are collectively referred to as the "PRML processing circuit".

A controller 6 controls an LD driver 7, a magnetic head driver 8, and the like by inputting, input information, the number of rotations and recording radius of the magneto-optical disk 1 and recording sector information as well as the environmental temperature and the like; and outputting a recording power, a recording signal, and the like. Reference numeral 9 denotes a magnetic head that applies a modulation magnetic field to a laser irradiation region of the magneto-optical disk 1 at the time of a recording operation and is arranged so as to oppose the optical head 5 with the interposition of the magneto-optical disk 1 therebetween. The magnetic head 9 is driven by the magnetic head driver 8.

At the time of information recording, the optical head 5 irradiates the magneto-optical disk 1 with recording laser light and simultaneously a magnetic field having a different polarity is applied from the magnetic head 9 in accordance with a recording signal. Also, the magnetic head 9 moves in the radial direction of the magneto-optical disk 1 in an interlocked manner with the optical head 5 and sequentially applies the magnetic field to the laser light irradiation region of the magneto-optical disk 1 at the time of recording, thereby recording information.

Next, an operation for recording information will be described with reference to FIGS. 7A to 7E. FIG. 7A shows a recording signal, FIG. 7B shows a recording power of the semiconductor laser, FIG. 7C shows a modulation magnetic field of the magnetic head 9, FIG. 7D shows a recording mark string recorded in the magneto-optical disk 1, and FIG. 7E shows a reproduction signal.

At the time of recording of the recording signal as shown in FIG. 7A, a light beam for recording having the predetermined recording power as shown in FIG. 7B is applied from the optical head 5 to the magneto-optical disk 1 concurrently with the start of the recording operation, and the modulation magnetic field as shown in FIG. 7C based on the recording signal of FIG. 7A is simultaneously applied to a light beam irradiation region of the magneto-optical disk 1 from the magnetic head 9.

Here, so-called pulse magnetic field modulation is adopted in which the applied magnetic field is modulated in accordance with the recording information and the recording laser light is modulated in a pulse manner in stationary cycles. As a result of those operations, in the course of cooling of the magneto-optical recording film 3 of the magneto-optical disk 1, the recording mark string as shown in FIG. 7D is formed in the magneto-optical disk 1. The slanted line portions and open portions of the recording mark string as shown in FIG. 7D represent magnetic domains having mutually opposite magnetization directions. Also, adopting such magnetic field modulation recording enables magnetic domains smaller than a spot size to be formed.

Next, a reproduction operation will be described with reference to FIGS. 8A to 8D. In the following description, a case will be described as an example, in which the magneto-optical recording film 3 of the magneto-optical disk 1 has a three-layer structure composed of a record holding layer (recording layer) where recording marks are held; a domain wall displacement layer (reproduction layer) where a domain wall is displaced to directly contribute to a reproduction signal; and a switching layer that switches a connection state between the recording layer and the reproduction layer.

FIG. 8A shows the state of magnetic domain reproduction, FIG. 8B shows a recording film state, FIG. 8C shows a medium temperature state, and FIG. 8D shows a reproduction signal. At the time of information reproduction, as shown in FIG. 8A, the magneto-optical recording film 3 is heated to a Ts temperature condition at which a domain wall of the reproduction layer of the magneto-optical recording film 3 is displaced, by irradiation with a light beam for reproduction. At this time, the switching layer as shown in FIG. 8B is placed under a state where it is connected with the recording layer and the reproduction layer by an exchange coupling in a region having a temperature below Ts.

When the magneto-optical recording film 3 is heated to the temperature Ts or higher by the irradiation with the light beam, the temperature of the switching layer reaches a Curie point and the switching layer is placed under a state where the connection with the reproduction layer and the recording layer is disconnected. Therefore, concurrently with the reaching of the domain wall of a recording mark to this Ts temperature range, the domain wall of the reproduction layer is instantly displaced to a position at which the domain wall exists with stability in terms of energy with respect to a temperature gradient of the reproduction layer, that is, to the maximum temperature point in the linear density direction of a temperature rise due to the irradiation with the light beam, while going across a land.

As a result, the magnetization state of the great majority of a region covered with the light beam for reproduction becomes the same, so that it becomes possible to obtain a reproduction signal having a shape close to the rectangular shape as shown in FIG. 8D even from a minute recording mark that cannot be reproduced according to an ordinary light beam reproduction principle. Accordingly, it becomes possible to reproduce the recording mark below the diffraction limit of an optical system with almost no lowering of a reproduction signal amplitude and to substantially improve a recording density and a transfer rate.

Next, a reproduction signal processing method of the PRML processing circuit shown in FIG. 6 will be described. In partial response signal processing applied to an ordinary optical disk reproduction signal, a partial response PR (1,1) or PR (1,2,1) is generally used because the optical disk reproduction signal has DC components and inter-code interferences due to lowering of a spatial frequency resulting from limitations of the optical system exert an influence.

When a magneto-optical medium of domain wall displacement detection type is used, however, the inter-code interferences due to the limitations of the optical system do not occur and a merit in adopting partial response that is a differentiating system is advocated against the backdrop of an increase in influence of crosstalk resulting from a reduction in track pitch and the like. For instance, by adopting a partial response PR (1, −1), it becomes possible to perform reproduction signal processing where the influence of low-frequency crosstalk components that are optically readable spatial frequencies is eliminated.

FIGS. 9A to 9H illustrate an example of PR (1, −1) reproduction signal processing. Note that a case where a (1, 7) RLL code is used as a modulation code will be described as an example. FIG. 9A shows an information signal string, FIG. 9B shows a recording signal string, FIG. 9C shows a recording mark string in the case where the recording signal is recorded in the magneto-optical disk, FIG. 9D shows a magneto-optical reproduction signal of domain wall displacement detection type in the case where the recording marks are reproduced, FIG. 9E shows a sampling signal level in the case where the reproduction signal of FIG. 9D is sampled with reference to PLL clocks, and FIG. 9F shows a signal level in the case where PR (1, −1) equalizing processing is performed on the sampling data of FIG. 9E.

FIG. 9G also shows a histogram of the signal level of FIG. 9F, that is, so-called level jitter. FIG. 9H shows a result of PR reproduction processing judgment where a three-value-level judgment is performed on the signal level of FIG. 9F and it is judged whether the signal level is "0" or not. In more detail, when the signal level is "0", a judged result gives "0", and, when the signal level is not "0", a judged result gives "1".

Here, the information string as shown in FIG. 9H is reproduction of the information signal string as shown in FIG. 9A, which means that it is possible to reproduce the information. The fundamental processing principle of the PR processing has been described above. However, usually the three-value-level judgment as shown in FIG. 9H is not directly performed, a technique is used in which the signal level of FIG. 9F is further processed and subjected to PRML processing which performs reproduction signal processing using maximum likelihood decoding (ML) or Viterbi decoding, whereby reproduction information with less errors is obtained.

In conventional magneto-optical reproduction of domain wall displacement detection reproduction type, the reproduction signal waveform becomes a rectangular waveform having no inter-code interference, as described above. FIG. 10A shows an example of this reproduction signal waveform. As shown in FIG. 10A, when attention is focused on a saturation amplitude portion (portion surrounded by a circle A) where no level fluctuation of the signal waveform originally exists, many high-frequency noise components are actually contained. Also, in a portion (portion surrounded by a circle B) where no level fluctuation originally exists, there sometimes occurs a situation where a level fluctuation and a waveform distortion occur.

Those high-frequency noise and waveform distortion lead to a level error at the time of PR detection, that is, those become a cause for deterioration of level jitter in the signal level histogram shown in FIG. 9G. In ordinary cases, those noises are removed using a low-pass filter (LPF). However, the LPF affects not only the noises but also the inclinations of the rising edge and falling edge of signal polarity changing of the rectangular reproduction signal. Consequently, there is a case where the excess application of the LPF results in deterioration of jitter at the edge positions of the signal polarity changing and an adverse effect is exerted on PLL detection and the like.

FIG. 10B also shows a sampling level in the case where sampling is performed after the reproduction signal of FIG. 10A has passed through the LPF. As can be seen from this figure, the rising edge and falling edge of the signal polarity changing are gently changed. If the rising edge and the falling edge are changed in this manner, this leads to a problem in that levels of the reproduction signal at sampling points with interposition of the edge position therebetween are changed as indicated by arrows in FIG. 10B and this in turn changes levels in the histogram.

SUMMARY OF THE INVENTION

The present invention has been made in view of the conventional problems described above, and is aimed at providing a method and apparatus for reproducing information from an optical recording medium, with which it is possible to alleviate level jitter resulting from a noise component at a signal saturation level or a waveform distortion in a portion except a signal polarity portion and to obtain good error characteristics.

The method and apparatus for reproducing information according to the present invention are as follows.

First, the information-reproducing apparatus for reproducing a recording mark below a diffraction limit of light from an optical recording medium according to the present invention includes: an optical head for obtaining a reproduction signal from the medium; a limiter for setting a predetermined upper limit value or a predetermined lower limit value and limiting the reproduction signal to the upper limit value or the lower limit value; and a circuit for performing partial response equalizing processing on the reproduction signal limited by the limiter and decoding the reproduction signal.

Also, the information-reproducing method of reproducing a recording mark below a diffraction limit of light from an optical recording medium according to the present invention includes the steps of: obtaining a reproduction signal from the medium; setting a predetermined upper limit value or a predetermined lower limit value and limiting the reproduction signal to the upper limit value or the lower limit value; and performing partial response equalizing processing on the reproduction signal limited by the limiter and decoding the reproduction signal.

BRIEF DESCRIPTION OF THE DRAWINGS

FIG. 1 is a block diagram-showing a first embodiment of the present invention;

FIGS. 3A, 3B, 3C, 3D, 3E, 3F and 3G are timing charts illustrating reproduction processing according to the first embodiment of the present invention;

FIG. 4 is a block diagram showing a second embodiment of the present invention;

FIGS. 5A, 5B, 5C, 5D, 5E, 5F, 5G and 5H are timing charts illustrating reproduction processing according to the second embodiment of the present invention;

FIGS. 7A, 7B, 7C, 7D and 7E are timing charts illustrating a recording operation by the conventional magneto-optical recording/reproduction apparatus shown in FIG. 6;

FIGS. 9A, 9B, 9C, 9D, 9E, 9F, 9G and 9H are timing charts illustrating reproduction processing by the conventional magneto-optical recording/reproduction apparatus.

DESCRIPTION OF THE PREFERRED EMBODIMENTS

Embodiments of the present invention will now be described in detail with reference to the accompanying drawings.

First Embodiment

Figure 6:
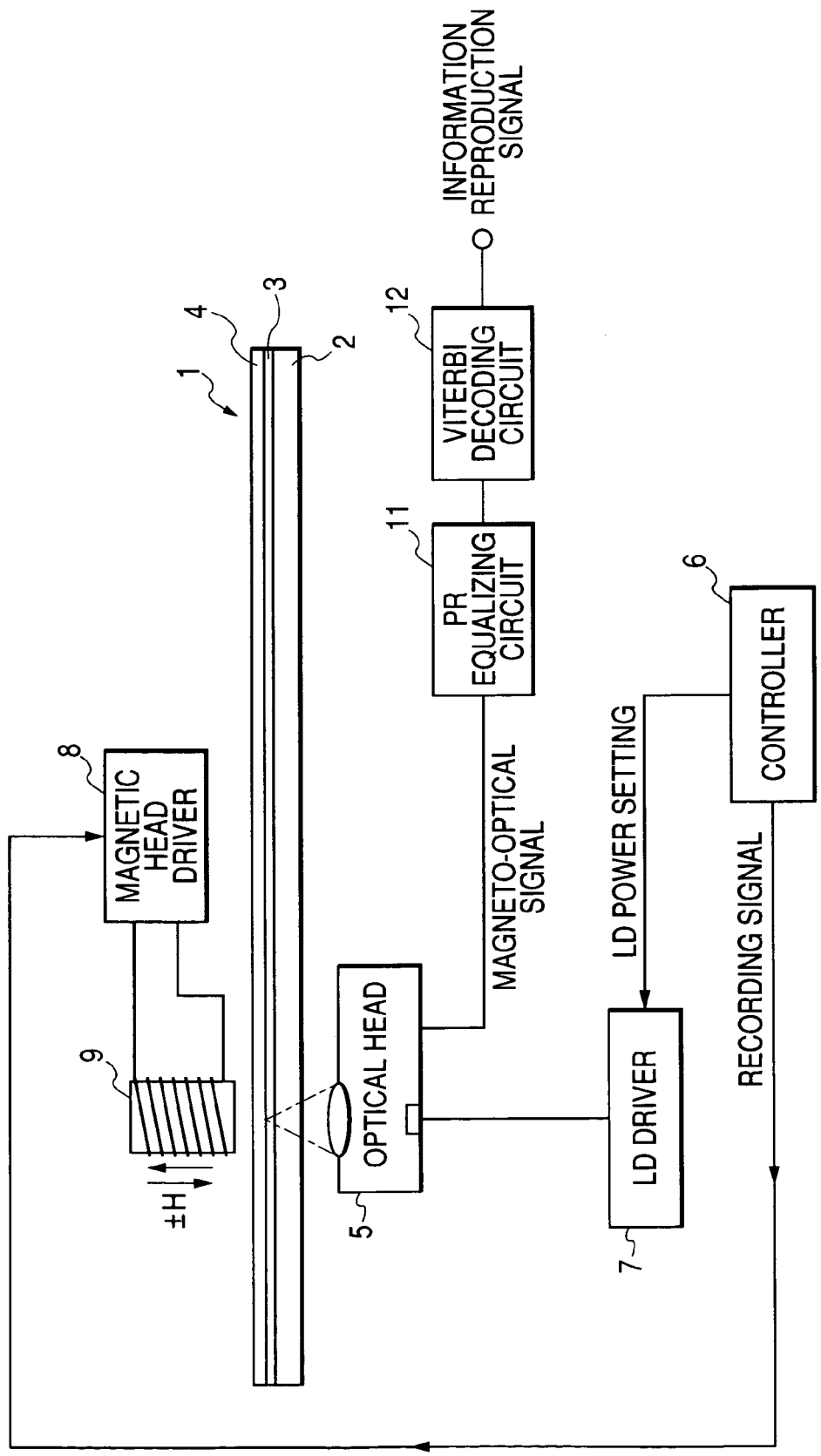
FIG. 6 is a block diagram showing a conventional magneto-optical recording/reproduction apparatus.

FIG. 1 is a block diagram showing a construction of a first embodiment of the magneto-optical recording/reproduction apparatus according to the present invention. In FIG. 1, each portion that is the same as that of the conventional apparatus shown in FIG. 6 is given the same reference numeral and the description thereof will be omitted. That is, a magneto-optical disk 1 of domain wall displacement detection type, a substrate 2, a magneto-optical recording film 3, and an optical head 5 are each the same as that shown in FIG. 6.

The optical head 5 includes a semiconductor laser for recording/reproduction, a condensing lens for condensing a laser light flux of the semiconductor laser, an actuator for driving the condensing lens, a beam splitter, and a polarizing beam splitter, a photosensor for detecting reflection light from the magneto-optical disk 1, and the like. The wavelength of the semiconductor laser in the optical head λ is set to, for example, 650 nm and the NA of the condensing lens is set to, for example, 0.60.

Also, a controller 6 for controlling each portion in the apparatus, an LD driver 7 for driving the semiconductor laser in the optical head 5, a magnetic head 9 for applying a recording magnetic field to the magneto-optical disk 1, a magnetic head driver 8 for driving the magnetic head 9, a PR equalizing circuit 11 for performing waveform equalization of a reproduction signal, and a Viterbi decoding circuit 12 for performing Viterbi decoding are, respectively, the same as those shown in FIG. 6.

At the time of recording of information, the optical head 5 irradiates the magneto-optical disk 1 with a light beam for recording in a pulse manner and the magnetic head 9 applies recording magnetic fields having different polarities in accordance with a recording signal. Also, at the time of reproduction of the information, the optical head 5 irradiates the magneto-optical disk 1 with a light beam for reproduction.

FIG. 1 differs from FIG. 6 in that a limiter circuit 10 is provided at the previous stage of the PR equalizing circuit 11 and other constructions are the same as those shown in FIG. 6. The limiter circuit 10 is an amplitude limiting circuit including an operational amplifier, a diode and the like, and is a circuit that corrects the amplitude of a reproduction signal to a predetermined upper limit value or a predetermined lower limit value.

Figure 2A:
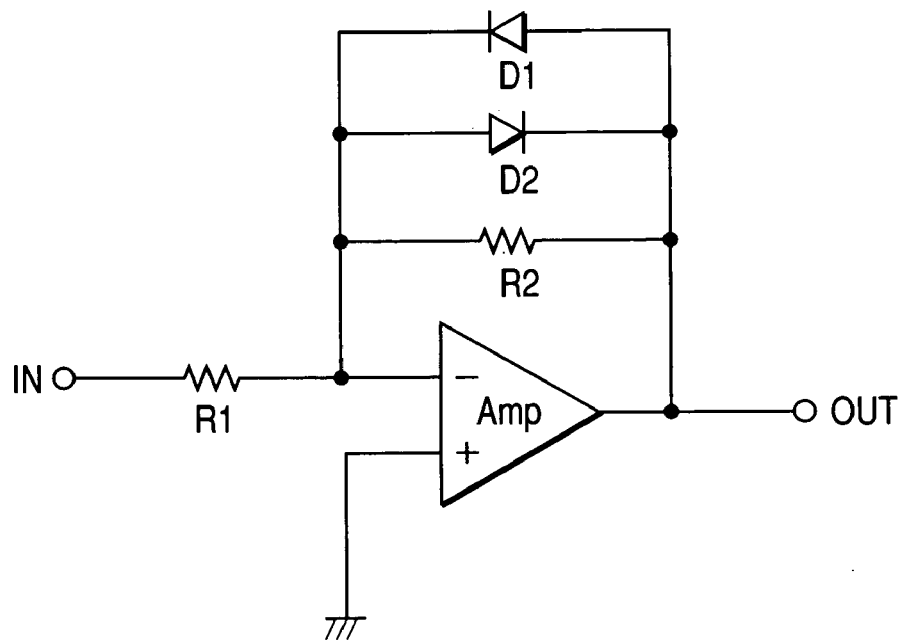
FIGS. 2A and 2B show a construction example and operation characteristics of a limiter circuit used in the first embodiment of the present invention, respectively.
Figure 2B:
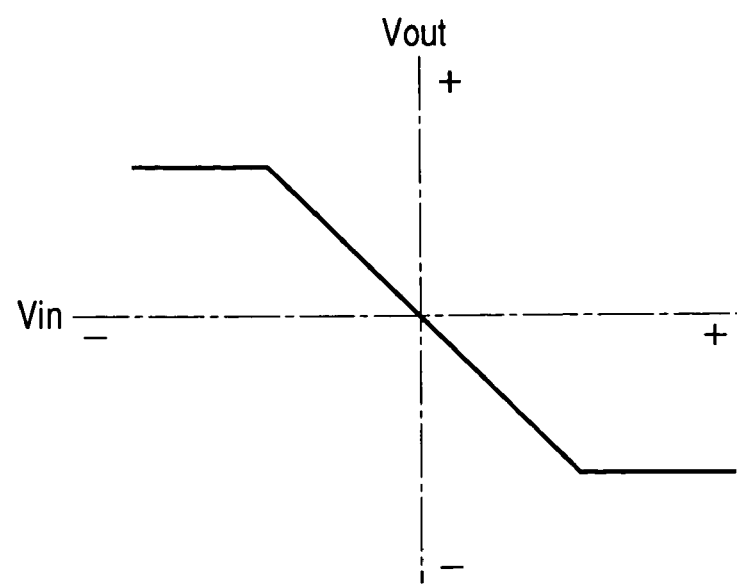

FIG. 2A shows a fundamental construction of the limiter circuit 10, while FIG. 2B shows operation characteristics of the limiter circuit 10. As shown in FIG. 2A, the limiter circuit 10 includes an operational amplifier Amp, resistors R1 and R2, and diodes D1 and D2. Also, as shown in FIG. 2B, the limiter circuit 10 is constructed so that its output value becomes saturated when receiving an input signal higher than or lower than a predetermined input level. This limiter circuit 10 sets the upper limit value and the lower limit value for the reproduction signal.

Also, the PR equalizing circuit 11 is a circuit that performs waveform equalization of the reproduction signal, that is, performs equalization to a PR (1, −1) characteristic. To do so, the PR equalizing circuit 11 mainly includes a low-pass filter, a differentiating circuit, and a transversal filter. Those construction elements of the PR equalizing circuit 11 are well known, so that the detailed description thereof will be omitted.

The fundamental recording operation according to this embodiment is the same as that shown in FIGS. 7A to 7E. In brief, at the time of recording of the recording signal of in FIG. 7A, a light beam set at the predetermined recording power as shown in FIG. 7B and modulated in a pulse manner is applied to the magneto-optical disk 1 from the optical head 5, and simultaneously the modulation magnetic field as shown in FIG. 7C based on the recording signal of FIG. 7A is applied to a light beam irradiation region from the magnetic head 9. In this embodiment, the bottom power of the modulation laser light is set to "0", although the present invention is not limited to this and the bottom power may be set to a value other than "0".

Also, laser light modulation is described as the clock frequency of a modulation code, although the present invention is not limited to this and an integer multiple of the clock frequency may be used. Further, the pulse irradiation has a duty of 50%, although the present invention is not limited to this and the pulse irradiation may have any other duty. As a result of those recording operations, the recording mark string as shown in FIGS. 7A to 7E is formed in the course of cooling of the magneto-optical recording film 3 and so-called pulse-assisted magnetic field modulation recording is executed. Adopting such magnetic field modulation recording enables magnetic domains smaller than a spot size to be formed.

Also, an operation principle of reproduction of domain wall displacement detection type according to this embodiment is the same as that shown in FIGS. 8A to 8D. When briefly described, at the time of information reproduction, first, as shown in FIGS. 8A to 8D, the magneto-optical recording film 3 is heated to the Ts temperature condition, at which a domain wall of the reproduction layer of the magneto-optical recording film 3 is displaced, by irradiation with a light beam for reproduction. In the temperature range lower than Ts, the switching layer is placed under a state where it is connected with the recording layer and the reproduction layer through an exchange coupling.

When the magneto-optical recording film 3 is heated to the Ts temperature or higher by the irradiation with the light beam for reproduction, the temperature of the switching layer reaches a Curie point and the layer is placed under a state where the exchange coupling with the reproduction layer and the recording layer is disconnected. As a result, concurrently with the reaching of the domain wall of a recording mark to this Ts temperature range, the domain wall of the reproduction layer is instantly displaced to a position, at which the domain wall exists with stability in terms of energy with respect to a temperature gradient of the reproduction layer, that is, to the maximum temperature point in the linear density direction of a temperature rise due to the irradiation with the light beam, while going across a land.

Figure 8A:
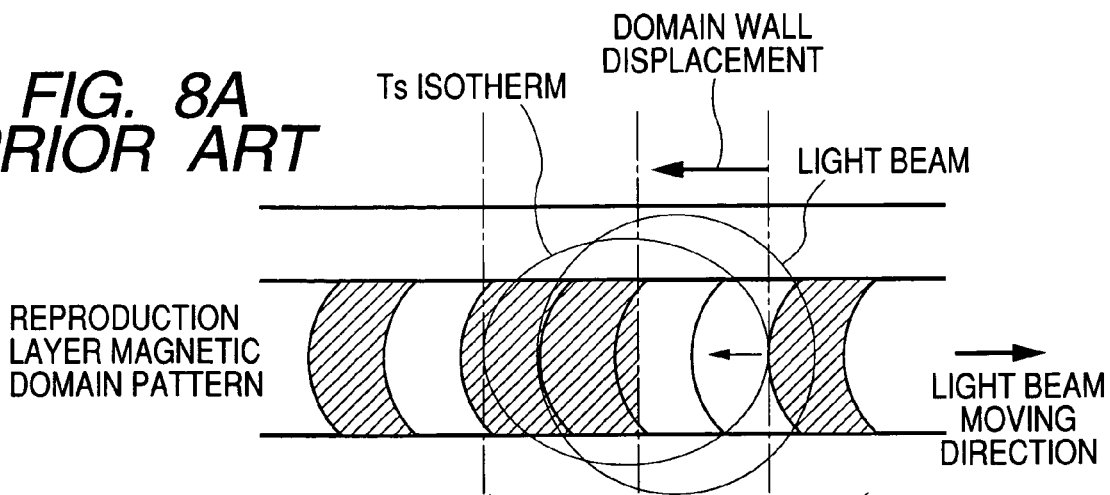
FIGS. 8A, 8B, 8C and 8D illustrate domain wall displacement detection reproduction by the conventional magneto-optical recording/reproduction apparatus.
Figure 8B:
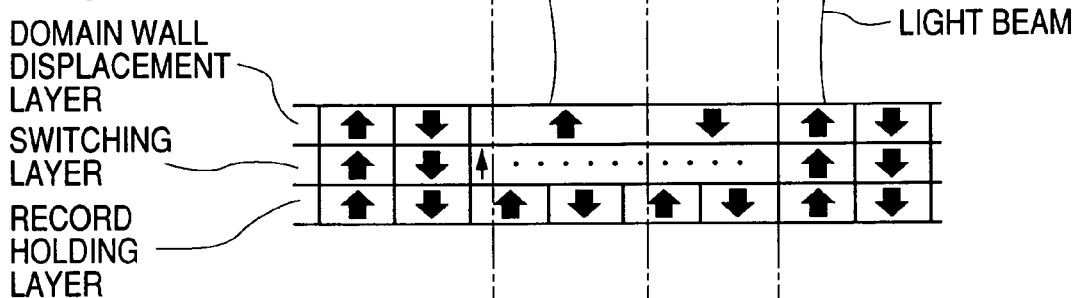
Figure 8C:
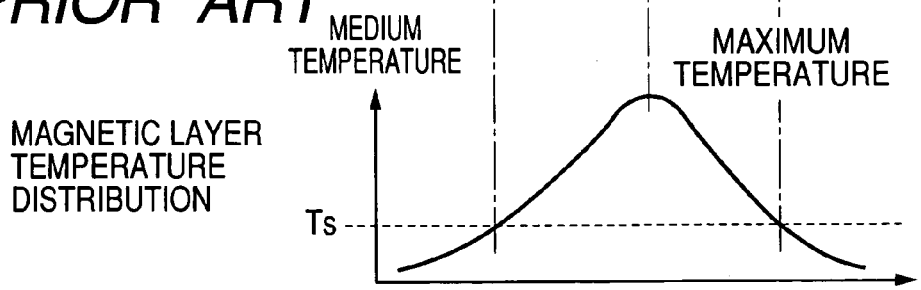
Figure 8D:
Figure 10A:
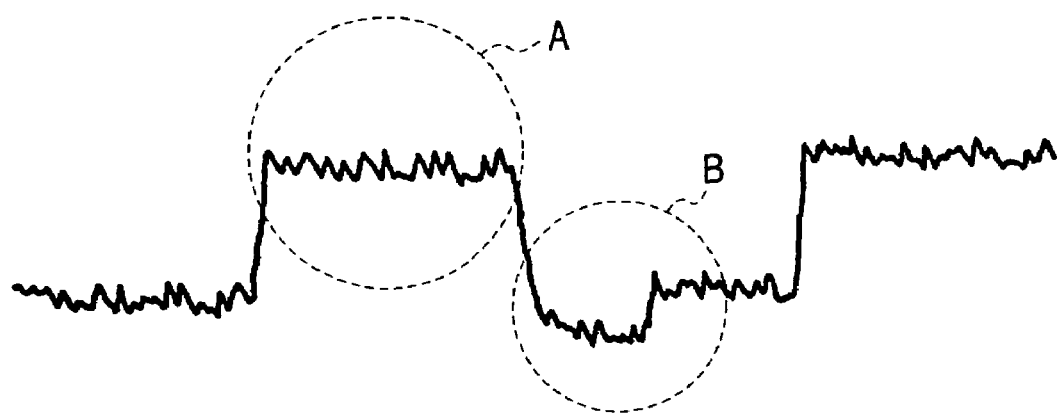
FIGS. 10A and 10B are signal waveform diagrams showing problems of the conventional magneto-optical recording/reproduction apparatus.
Figure 10B:
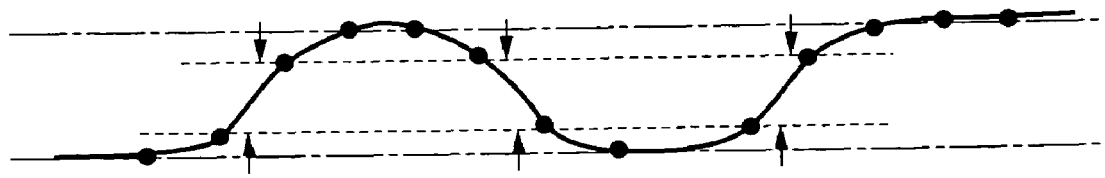

As a result, the magnetization state of the great majority of a region covered with the light beam for reproduction becomes the same, so that a reproduction signal having a shape close to the rectangular shape as shown in FIGS. 8A to 8D is obtained even from a minute recording mark that cannot be reproduced according to an ordinary light beam reproduction principle. In this embodiment, the magneto-optical recording film 3 has a three-layer structure as shown in FIG. 8B where a reproduction layer, a recording layer, and a switching layer are combined with each other, although the present invention is not limited to this.

Next, a reproduction signal processing method according to this embodiment will be described with reference to FIGS. 3A to 3G. A case where a (1, 7) RLL code is used as a modulation code will be described as an example. FIG. 3A shows a recording information string, FIG. 3B shows a recording signal string, FIG. 3C shows a recording mark string in the case where the recording signal string of FIG. 3B is recorded in the magneto-optical disk 1, FIG. 3D shows a domain wall displacement detection magneto-optical reproduction signal in the case where the recording mark string of FIG. 3C is reproduced from the magneto-optical disk 1, FIG. 3E shows an output of the limiter circuit 10, and FIG. 3F shows a signal obtained by performing PR (1, −1) equalizing processing on the signal of FIG. 3E.

FIG. 3G also shows a histogram of the signal level (FIG. 3F), that is, so-called level jitter. The magneto-optical reproduction signal of FIG. 3D reproduced from the magneto-optical disk 1 passes through a not-shown amplifier and high-pass filter and the like, and DC components are removed by this high-pass filter.

The signal, from which the DC components have been removed, is inputted into the limiter circuit 10, which then limits the reproduction signal using the upper limit value or the lower limit value. The reproduction signal level is corrected to the predetermined upper limit value or the predetermined lower limit value to obtain a signal as shown in FIG. 3E. That is, subjecting the magneto-optical reproduction signal of FIG. 3D to the limiter processing by the limiter circuit 10 results in the reproduction signal waveform as shown in FIG. 3E in which no high-frequency noise component and the like exist.

The upper limit value or lower limit value of the output of the limiter circuit 10 become a value in which only noise components determined by electric circuits are superimposed on each other. It is sufficient that the upper limit value or lower limit value of the limiter may be optimized with reference to an evaluation index such as an error rate. This signal is subjected to the PR equalizing processing by the PR equalizing circuit 11 to obtain the reproduction signal as shown in FIG. 3F. The solid circles of FIG. 3F indicate sampling points.

This signal is based on a signal restricted to the upper limit value or the lower limit value by the limiter circuit 10, so that this signal becomes a signal in which level jitter has been reduced to an extremely small level. Accordingly, the histogram of this signal level becomes the histogram where the levels of three values are separated from one another very well as shown in FIG. 3G. As a result, level errors at the time of PR level detection are drastically reduced, which makes it possible to reduce misjudgments. In addition, sampling level differences clearly appear also at the time of maximum likelihood decoding and Viterbi decoding, so that decoding with higher accuracy becomes possible.

Second Embodiment

FIG. 4 is a block diagram showing a second embodiment of the present invention. FIG. 4 differs from FIG. 1 in that a reproduction signal processing circuit 13 is provided in place of the limiter circuit 10 and the PR equalizing circuit 11, and other constructions are the same as those shown in FIG. 1. The reproduction signal processing circuit 13 is a digital signal processing circuit that performs the reproduction signal sampling, limiter limitation, and PR equalization as digital processing. The fundamental recording operation and the fundamental reproduction operation principle according to this embodiment are the same as those in the first embodiment.

Next, a reproduction signal processing method according to this embodiment will be described with reference to FIGS. 5A to 5H. A case where a (1, 7) RLL code is used as a modulation code will be described as an example. FIG. 5A shows a recording information string, FIG. 5B shows a recording signal string, FIG. 5C shows a recording mark string in the case where the recording signal string of FIG. 5B is recorded in the magneto-optical disk 1, and FIG. 5D shows a domain wall displacement detection magneto-optical reproduction signal in the case where the recording mark string of FIG. 5C is reproduced.

FIG. 5E also shows a sampling value string $\{V(i)\}$ obtained by sampling the magneto-optical signal at sampling times i by PLL clocks, and FIG. 5F shows a signal string $[V1(i)]$ obtained by defining an upper limit value (Vmax) or a lower limit value (Vmin) for the sampling values of FIG. 5E and performing a conversion processing where a result of "$V(i)=Vmax$" is obtained when "$V(i)>Vmax$" and a result of "$V(i)=Vmin$" is obtained when "$V(i)<Vmin$", that is the limiter processing. FIG. 5G further shows a signal string obtained by performing calculation processing of "$[Vpr1(i)]=[V1(i)]-[V1(l-1)]$" on the signal string $[V1(i)]$.

The magneto-optical reproduction signal of domain wall displacement detection type has no inter-code interference, so that this processing becomes a processing equivalent to PR (1, −1) equalization processing. When it is necessary to perform additional equalization depending on the signal bandwidth of a transmission system, it is sufficient that the equalizing processing be further performed. FIG. 5H also shows a histogram of the signal level of FIG. 5G, that is, so-called level jitter.

The level distribution of the signal string $[Vpr1(i)]$ as shown in FIG. 5G becomes a distribution of differential values from Vmax or Vmin except for level fluctuations at sampling points due to edge shift. Therefore, it becomes possible to substantially alleviate the influence of noises or waveform distortions at a reproduction signal saturation level, to separate the levels of three values very well, and to obtain a PR (1, −1) equalized output. As a result, it becomes possible to drastically reduce level errors at the time of PR level detection and to suppress misjudgments.

In addition, sampling level differences clearly appear also at the time of maximum likelihood decoding and Viterbi decoding, so that it becomes possible to perform decoding with higher accuracy. The experiment conducted by the inventor of the present invention could reduce that a characteristic of "error rate≈1E-4" in a conventional signal processing system to "error rate≈5E-5" by using the technique of the present invention, which means that it is possible to reduce reproduction errors by half.

What is claimed is:

1. An information-reproducing apparatus for reproducing a recording mark below a diffraction limit of light from an optical recording medium, comprising:
   an optical head for obtaining a reproduction signal from the medium;
   a limiter for setting a predetermined upper limit value and a predetermined lower limit value and limiting an amplitude of the reproduction signal to the upper limit value and the lower limit value; and
   a circuit for performing partial response equalizing processing on the reproduction signal limited by the limiter and decoding the reproduction signal.

2. The information-reproducing apparatus according to claim 1, wherein the limitation of the reproduction signal to the upper limit value and the lower limit value by the limiter is performed on the reproduction signal in an analog state.

3. The information-reproducing apparatus according to claim 1, wherein the limitation of the reproduction signal to the upper limit value and the lower limit value by the limiter is performed by subjecting the reproduction signal to digital calculation processing after sampling of the reproduction signals.

4. The information-reproducing apparatus according to claim 1, wherein the optical recording medium is a magneto-optical recording medium of domain wall displacement detection type.

5. An information-reproducing method of reproducing a recording mark below a diffraction limit of light from an optical recording medium, comprising the steps of:
   obtaining a reproduction signal from the medium;
   setting a predetermined upper limit value and a predetermined lower limit value and limiting an amplitude of the reproduction signal to the upper limit value and the lower limit value; and performing partial response equalizing processing on the reproduction signal limited by the limiter and decoding the reproduction signal.

6. The information-reproducing method according to claim 5, wherein the optical recording medium is a magneto-optical recording medium of domain wall displacement detection type.

7. An information-reproducing apparatus for reproducing a recording mark from an optical recording medium, comprising:
   an optical head for obtaining a reproduction signal from the medium;
   a limiter for setting a predetermined upper limit value and a predetermined lower limit value and limiting an amplitude of the reproduction signal to the upper limit value and the lower limit value; and
   a circuit for performing partial response equalizing processing on the reproduction signal limited by the limiter and decoding the reproduction signal.

8. An information-reproducing method of reproducing a recording mark from an optical recording medium, comprising the steps of:
   obtaining a reproduction signal from the medium;
   setting a predetermined upper limit value and a predetermined lower limit value and limiting an amplitude of the reproduction signal to the upper limit value and the lower limit value; and
   performing partial response equalizing processing on the reproduction signal limited by the limiter and decoding the reproduction signal.

* * * * *

UNITED STATES PATENT AND TRADEMARK OFFICE
CERTIFICATE OF CORRECTION

PATENT NO. : 7,289,408 B2 Page 1 of 1
APPLICATION NO. : 10/863470
DATED : October 30, 2007
INVENTOR(S) : Yasuyuki Miyaoka It is certified that error appears in the above-identified patent and that said Letters Patent is hereby corrected as shown below:

COLUMN 2:

Line 44, "defection" should read --deflection--; and
Line 47, "defection" should read --deflection--.

COLUMN 6:

Line 17, "diagram-showing" should read --diagram showing--.

COLUMN 7:

Line 4, "length of" should read --length $\lambda$ of--; and
Line 4, "head $\lambda$" should read --head 5--.

Signed and Sealed this

First Day of July, 2008

JON W. DUDAS
*Director of the United States Patent and Trademark Office*